US005573870A

United States Patent [19]
Andrews

[11] Patent Number: 5,573,870
[45] Date of Patent: Nov. 12, 1996

[54] QUICK CHANGE BATTERY PACK ASSEMBLY

[75] Inventor: Jonathan N. Andrews, Monmouth, Oreg.

[73] Assignee: Hewlett-Packard Company, Palo Alto, Calif.

[21] Appl. No.: 639,665

[22] Filed: Apr. 29, 1996

[51] Int. Cl.⁶ .................................................. H01M 2/10
[52] U.S. Cl. ................................ 429/96; 429/98; 429/123
[58] Field of Search .............................. 429/96–100, 123; 439/500, 909, 923; 361/434; D13/103

[56] References Cited

U.S. PATENT DOCUMENTS

| | | | |
|---|---|---|---|
| 5,224,870 | 7/1993 | Weaver et al. | 429/98 X |
| 5,413,499 | 5/1995 | Wright, Jr. et al. | 429/98 X |
| 5,506,488 | 4/1996 | Leiserson | 429/100 X |
| 5,510,205 | 4/1996 | Ozer | 429/123 X |

OTHER PUBLICATIONS

Operating And Service Manual, Lifepak 5, Cardioscope/Recorder And DC Defibrillator, P/N 09–10427, Physio–Control, Jan. 1977.
Responder 1500, Defibrillator/Monitor Operator Manual, Marquette Electronics, Mar. 1, 1991, p. 1.
PD 1400 Service Manual, Zoll Medical Corporation, Checks And Procedures, Copyright 1992, (month not available).

*Primary Examiner*—Anthony Skapars

[57] ABSTRACT

A battery pack assembly has a removable housing which fits within a pocket. The pocket has electrical connectors mounted at a rearward wall. A slot is formed in the base of the pocket near the forward end. Shoulders are located near the forward end and spaced above the base. A battery pack housing has electrical connectors located at its rearward wall that telescopingly fit with the electrical connectors of the pocket. The housing has a base with flanges on each side which engage the shoulders. The housing has a cantilevered resilient tab that is located between the flanges. The tab has a detent which snaps into the slot.

16 Claims, 4 Drawing Sheets

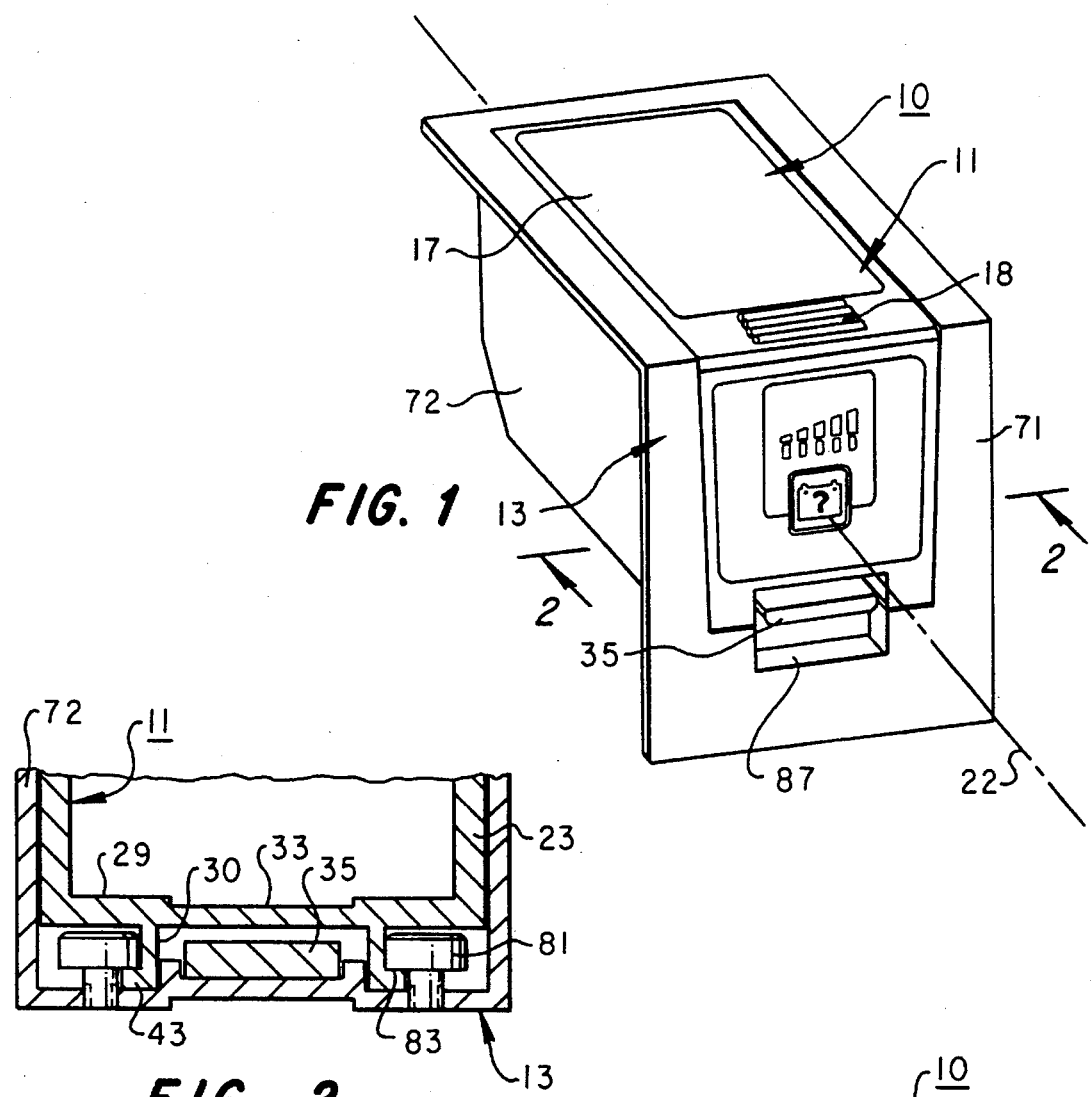
FIG. 1
FIG. 2
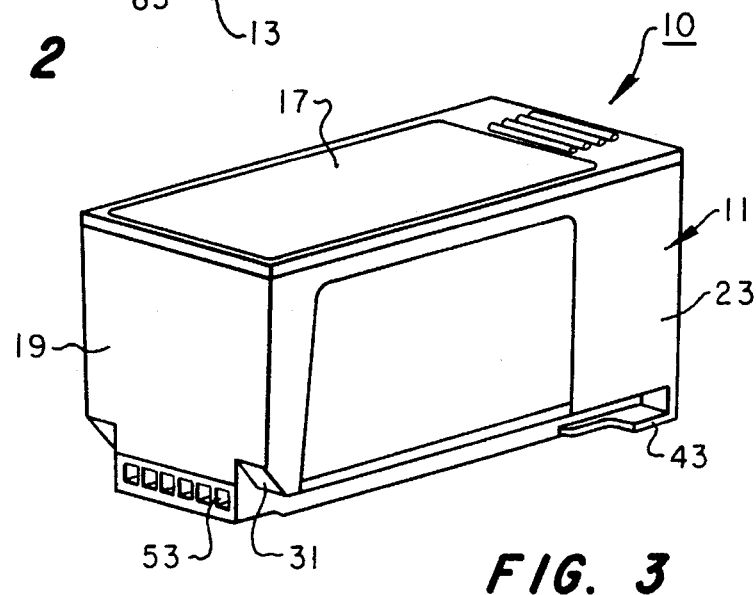
FIG. 3

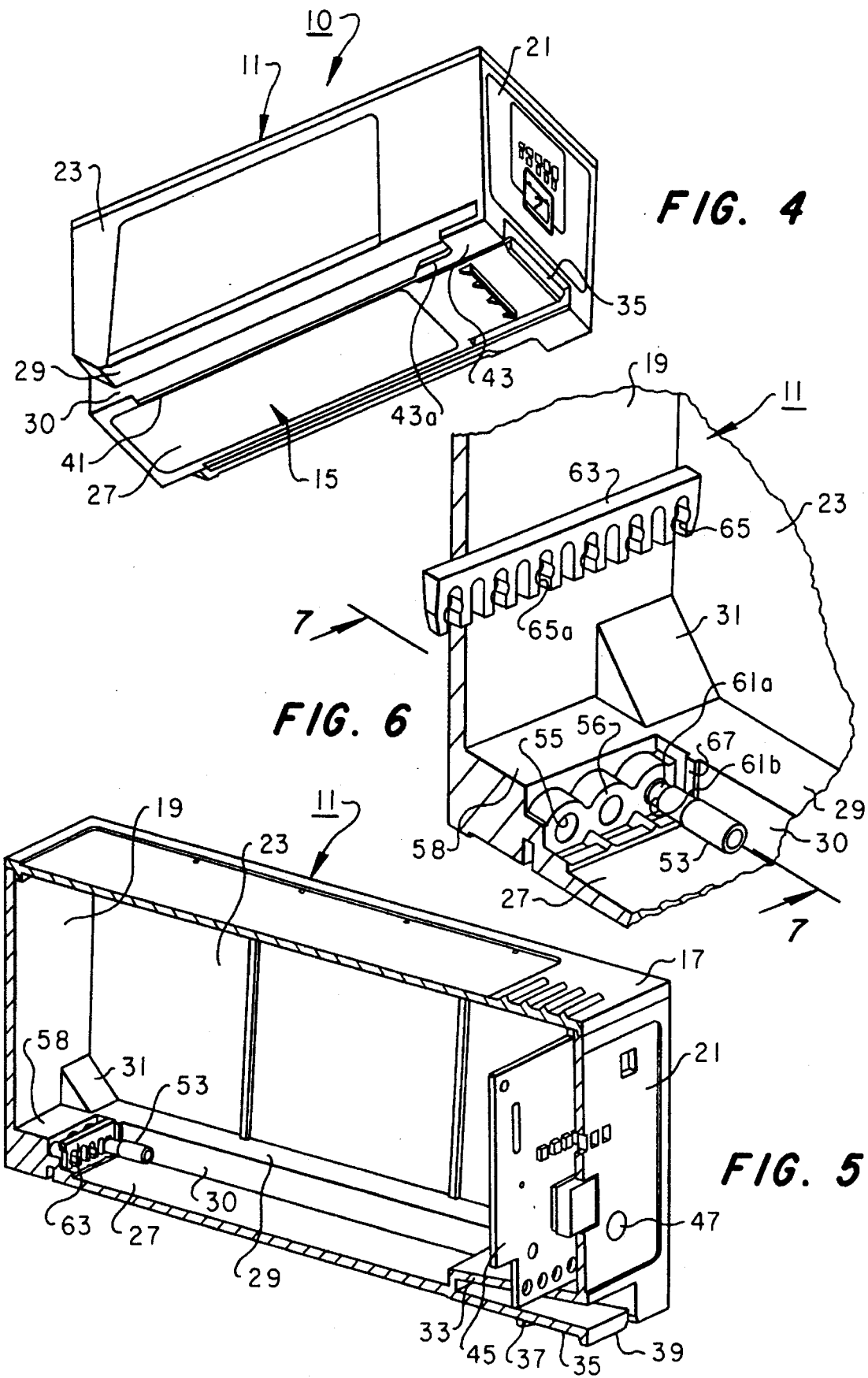

5,573,870

QUICK CHANGE BATTERY PACK ASSEMBLY

Field of the Invention

This invention relates in general to battery pack assemblies, and in particular to structural features of a battery pack housing and pocket for receiving the battery pack housing.

Background of the Prior Art

Many portable electrical devices utilize rechargeable batteries. The batteries are often combined in a battery pack which comprises a housing containing a number of batteries. The housing has electrical connectors and a latching mechanism which enables it to slide into and out of a pocket. The pocket may be built into the electrical device, or it may be a separate unit. The pocket has electrical connectors that mate with the connectors of the battery pack as the battery pack is inserted into the pocket.

Often, a user will have more than one battery pack for each device, such as a portable defibrillator. When the charge on one battery pack declines, if line power is not readily accessible, the user may remove the discharged battery pack and replace it with a fully charged battery pack. Later when line power is accessible, the user will again install the discharged battery pack and recharge it. This results in the battery packs being installed and removed from the pocket numerous times.

A variety of battery pack assemblies are known. These include different types of latches, electrical connectors and other structural features. While many exist, improvements are desirable, particularly in enhancing the installation and removal of the battery pack. Also, it is idesirable to have few parts that require assembly to reduce expense.

SUMMARY OF THE INVENTION

The battery pack assembly includes a pocket, which has a longitudinal axis with an open forward end, open top and a closed rearward end. The pocket has a base and sidewalls. A plurality of electrical connectors are mounted at the rearward end of the pocket for connection to the electrical device. A slot is formed in the base next to the forward end of the pocket. The pocket also has a pair of shoulders next to the forward end on opposite sides of the axis, spaced above and facing the base.

A battery pack removably fits in the pocket. The battery pack includes a battery housing having a forward end, rearward end, and a base. The battery housing has electrical connectors located at its rearward end which telescopingly engage the electrical connectors of the pocket. The base of the housing has radially spaced apart flanges at the forward end that slide between the shoulders and the base of the pocket to retain the battery pack housing. A cantilevered resilient tab is located between the flanges. The tab has a downward protruding detent which snaps into the slot in the pocket as the battery pack is moved into the pocket.

The electrical connectors of the battery pack housing are mounted to allow some compliance movement during insertion. This is accommodated by a retainer which fits rigidly in the housing and has elongated apertures that fit over reduced diameter necks on the connectors. The retainer prevents movement of the connectors in a longitudinal direction, but allows compliance movement of the connectors in directions other than longitudinally.

DESCRIPTION OF THE DRAWINGS

FIG. 1 is a perspective view illustrating a battery pack assembly of the preferred embodiment of the invention.

FIG. 2 is a partial sectional view of the battery pack assembly of FIG. 1, taken along the line 2—2 of FIG. 1.

FIG. 3 is a perspective view of the battery pack housing of the battery pack assembly of FIG. 1, shown from a left rear perspective.

FIG. 4 is another perspective view of the battery pack housing of FIG. 1, shown from a lower left perspective.

FIG. 5 is a perspective, partially sectional view of the battery pack housing of FIG. 1.

FIG. 6 is an enlarged, partially exploded perspective view of a portion of the battery pack housing of FIG. 1, showing the electrical connectors and mounting structure.

DETAILED DESCRIPTION OF THE INVENTION

Figure 7:
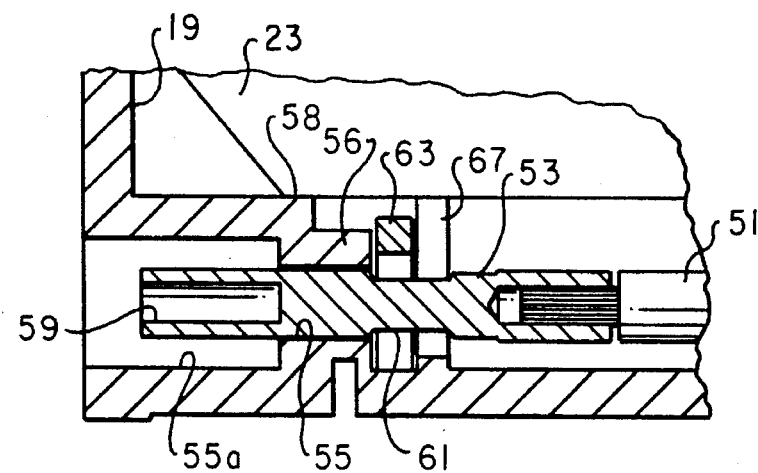
FIG. 7 is a sectional view of the battery pack housing of FIG. 1, taken along the line 7—7 of FIG. 6.

Referring to FIGS. 1—4, a battery pack 10 is shown installed within a pocket 13. Pocket 13 may be integrally mounted as part of an electrical device such as a defibrillator, or it may be a stand alone device. Battery pack 10 is removable from pocket 13.

Battery pack 10 comprises a plastic rectangular housing 11 having a base 15 and a top 17 which is parallel to base 15. Top 17 has gripping ridges 18 for facilitating manual insertion and removal of battery pack 10 from pocket 13 (FIG. 1). Battery pack housing 11 has a rearward wall 19 and a forward wall 21 that are perpendicular to base 15. Battery pack housing 11 has a longitudinal axis which extends parallel to base 15, through rearward wall 19 and forward wall 21. When installed in pocket 13, its longitudinal axis will coincide with longitudinal axis 22 of pocket 13. For convenience, axis 22 will be used herein to reference various features of housing 11 as well as pocket 13, even though when removed from pocket 13, the longitudinal axis of housing 11 will not coincide with pocket axis 22.

Sidewalls 23 extend upward from base 15 on opposite sides of axis 22. Sidewalls 23 are inclined relative to each other so that they diverge in an upward direction relative to axis 22. The words "upward" and "downward" as well as "horizontal" and "vertical" are used for convenience herein as it is not necessary that battery pack housing 11 be oriented as shown with top 17 above base 15. Preferably, each sidewall 23 intersects the plane of top 17 at an angle of about 85 degrees. The distance between side walls 23 at the lower edge is less than the distance between sidewalls 23 at the upper edge. Base 15, rearward wall 19, forward wall 21 and sidewalls 23 are preferably integrally formed. Top 17 is a separate piece that is attached Referring particularly to FIGS. 4–6 and 8, base 15 includes a center sill 27 which is a flat central section that separates two side platforms 29. Each side platform 29 is spaced above and connected to center sill 27 by a vertical wall 30. Each side platform 29 is parallel with center sill 27 and extends substantially the full length between forward wall 21 and rearward wall 19. A diagonal corner 31 joins the rearward end of platform 29 to rearward wall 21.

A forward platform 33 joins center sill 27 and extends forward to forward wall 21. Forward platform 33 inclines upward from center sill 27 to a point substantially flush with side platforms 29. A tab 35 integrally joins the rearward end of forward platform 33 and extends forward below forward platform 33. Tab 35 is cantilevered to center sill 27 and located in the same plane as center sill 27. Tab 35 has a lip 39 that is located in a plane flush with forward wall 21. A detent 37 comprising a straight rib protrudes downward from tab 35. Detent 37 is about half-way between the rearward edge of tab 35 and lip 39 and perpendicular to longitudinal axis 22. Tab 35 is resilient and flexible so that it can flex upward and downward relative to forward platform 33. The length of tab 35 is about 1 1/2 inches, which is approximately 22 percent of the overall length of battery pack housing 11.

As shown in FIG. 4, base 15 also includes a pair of runners 41 that extends a substantial distance along the length of battery pack housing 11. Each runner 41 is located at an outer edge of center sill 27 and protrudes downward a short distance so that the lower edges of runners 41 will be substantially flush with the lower edge of detent 37 when tab 315 is not undergoing flexure. This results in center sill 27 being elevated slightly relative to the lower edges of runners 41.

Referring still to FIG. 4, a pair of flanges 43 are formed at the forward edge of base 15, one on each side. Each flange 43 joins forward wall 21 and extends rearward a distance approximately the same length as tab 35. Flanges 43 are in a common plane with center sill 27, with tab 35 extending between them. Each flange 43 has a rearward portion 43a which extends forward from the rearward end of flange 43 to a point approximately adjacent detent 37, about one-half the total length of flange 43. Reward portion 43a has a width that is about one-half the width of the forward portion of flange 43. A vertical space exists between each flange 43 and the lower side of each side platform 29.

Figure 8:
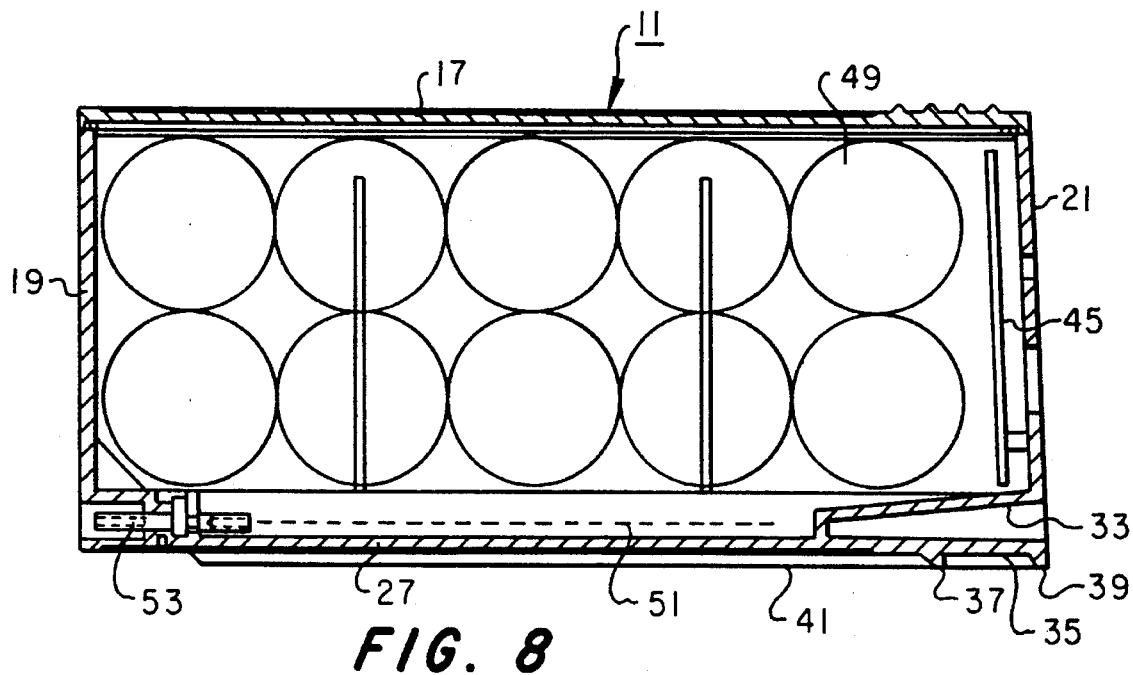
FIG. 8 is a vertical sectional view of the battery pack housing of FIG. 1, showing batteries positioned in the housing.

Referring to FIG. 5, a circuit board 45 is mounted in the interior of battery pack housing 11 just behind forward wall 21. Circuit board 45 is secured to forward wall 21 by a pair of fasteners 47. As shown in FIG. 8, one or more conventional batteries 49 are located within the interior of housing 11. Batteries 49 are connected by electrical connectors (not shown) to electrical components on circuit board 45. Circuit board 45 contains conventional electrical components and circuitry for regulating electrical power and recharging batteries 49.

A plurality of wires 51 extends from circuit board 45 to a number of electrical connectors 53, shown in FIG. 8. In one embodiment, there are six electrical connectors 53 and six wires 51. Electrical connectors 53 are located in a horizontal row at the junction of rearward wall 19 and base 15. Referring to FIG. 6, the mounting means for electrical connectors 53 includes a bulkhead 56 which has a plurality of holes 55 formed in it. Bulkhead 56 is a vertical wall extending between base 15 and rearward wall 19, parallel to rearward wall 19 but located forward of rearward wall 19 and connected by a rear horizontal platform 58. Rear platform 58 is in the same plane as side platforms 29.

Each electrical connector 53 is a cylindrical member or pin which extends through one of the holes 55. Connector 53 has a diameter sized to fit loosely within hole 55. The forward end of connector 53 extends into the interior of housing 11 at an elevation lower than side platforms 29 and above center sill 27. The rearward end of each connector 53 has a receptacle 59 formed within it and is located within an enlarged portion 55a of hole 55. Hole portion 55a is preferably rectangular as shown in FIG. 3. Connector 53 has a neck 61 of reduced diameter that is located in an intermediate section of connector 53 just forward of bulkhead 56. Neck 61 defines a forward shoulder 61a and a rearward shoulder 61b, as shown in FIG. 6.

A retainer 63, best shown in FIG. 6, snaps over the necks 61 of the six connectors 53. Retainer 63 is in the shape of a comb having downward facing slots or apertures 65 with open lower ends. Apertures 65 have centrally located curved portions 65a configured to fit loosely around necks 61. Curved portions 65a define a diameter less than the shoulders 61a, 61b so as to abut them. The upper and lower portions above and below curved portions 65a are spaced apart less than the diameter of necks 61, so that apertures 65 will flex and snap into place when retainer 63 is inserted over them. The length of each aperture 65 from the upper edge to the lower edge is about twice the diameter of each neck 61.

When snapped into housing 11, as shown in FIGS. 5 and 7, the forward side of retainer 63 will engage a rib 67 and the rearward side of retainer 63 will abut bulkhead 56. Rib 67 extends down vertical wall 30 and across center sill 27 forward of retainer 63. The thickness of retainer 63 is equal to the longitudinal length of each neck 61. The distance between bulkhead 56 and rib 67 is also equal to the longitudinal lengths of neck 61. Retainer 63, once snapped in place between vertical walls 30 and between bulkhead 56 and rib 67, prevents any longitudinal forward and rearward movement of connectors 53 because of the abutment with neck shoulders 61a, 61b. The loose fit of connectors 53 in holes 55 and necks 61 in aperture curved portions 65a, allow pivotal movement of the forward and rearward ends of connectors 53 about pivot points in holes 55. The pivotal movement allowed of the rearward ends of connectors 53 in holes 55a is in directions other than longitudinal, including both in horizontal directions as well as vertical directions.

Figure 9:
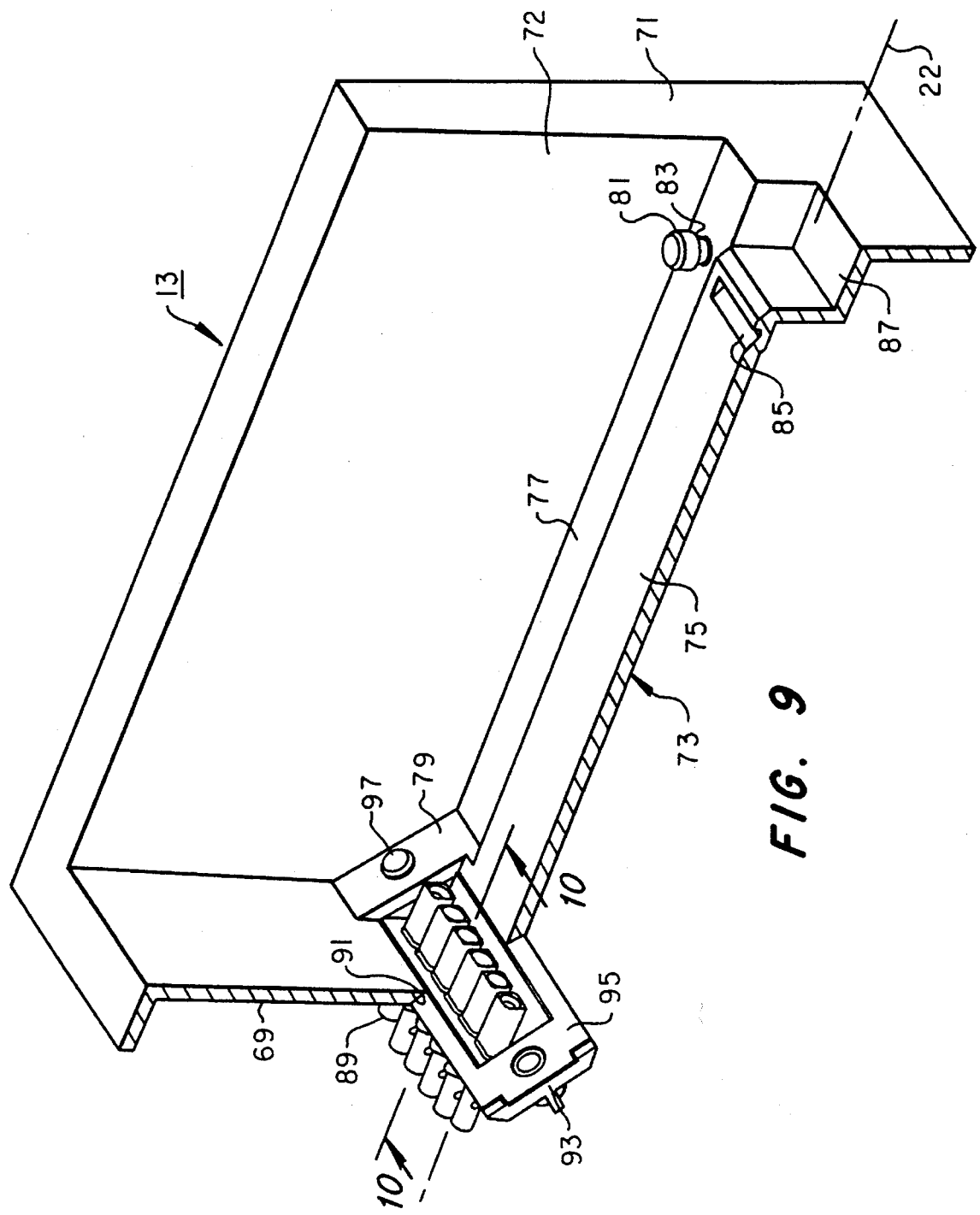
FIG. 9 is a perspective, partial sectional view of the pocket of the battery pack assembly of FIG. 1, with the battery pack housing removed.

Referring now to FIG. 9, pocket 13 has a rearward wall 69, a forward end 71 which has an opening for receiving housing 11, an open top for receiving housing 11, and a pair of sidewalls 72. Sidewalls 72 diverge in an upward direction at the same angle as housing sidewalls 23 for close mating reception. Base 73 is located in a plane parallel with longitudinal axis 22 and perpendicular to rearward wall 69.

Base 73 has a center sill 75 which has a width equal to the distance between housing runners 41 (FIG. 4). This results in two lateral margins 77 on each side which are recessed slightly relative to the center sill 75. A diagonal corner 79 is located at the junction between rearward wall 69 and each lateral margin 77. A pedestal 81 is mounted vertically to each lateral margin 77 near forward end 71. Pedestal 81 is a shoulder screw having a downward facing shoulder 83 on its enlarged head. As shown in FIG. 2, shoulder 83 is positioned above and parallel with lateral margin 77 for receiving flange rearward portion 43 a when battery pack 10 is installed.

A slot 85 extends across the width of center sill 75. Slot 85 is a closed bottom channel perpendicular to longitudinal axis 22. Slot 85 is positioned to receive detent 37 of tab 35 when battery pack 10 is installed. A recess 87 is located at the forward end of center sill 75, forward of slot 85. Recess 87 extends downward and provides a clearance for a user to grip tab 35 (FIG. 1).

Figure 10:
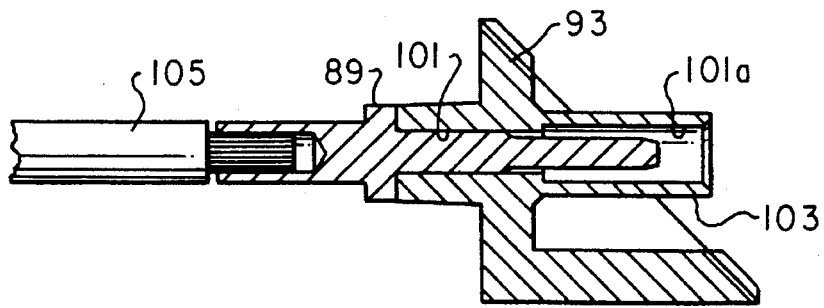
FIG. 10 is a sectional view of a portion of the pocket of FIG. 1, taken along the line 10—10 of FIG. 9.

Pocket 13 has a plurality of electrical connectors 89 for telescoping engagement with electrical connectors 53 (FIG. 5). As shown also in FIG. 10, electrical connectors 89 are mounted in a window 91 which is located at the junction of base 73 and rearward wall 69. A holder 93 holds all six electrical connectors 89 and mounts to window 91. Holder 93 has a gasket 95 on its forward face, the face being inclined at the same angle as diagonal corner 79. Fasteners 97 extend through diagonal corners 79 and into the body of holder 93 to retain holder 93 with pocket 13. Each electrical connector 89 extends through a hole 101 formed in holder 93. A sleeve 103 integrally joined to holder 93 extends forward from holder 93 into the interior of pocket 13 for each of the electrical connectors 89. Hole 101 has an enlarged area 101a which extends within sleeve 103 for receiving one of the connectors 53 (FIG. 7) of battery pack 10. Receptacles 59 slide telescopingly over the forward ends of connectors 89. The exterior of sleeve 103 is rectangular to fit within the rectangular hole portion 55a. A wire 105 secures to the outer end of each connector 89. Wire 105 leads to the electrical device (not shown).

In the preferred embodiment, two of the connectors 89 are mounted so that their forward ends will be more forward than the forward ends of the remaining connectors 89. Preferably, these two are the outer ones on each side of the row of connectors 89. These two serve as guides to facilitate insertion of battery pack connectors 53 (FIG. 7) over connectors 89.

In operation, to install battery pack 10, the user places battery pack 10 within pocket 13 with battery pack forward wall 21 initially located forward of pocket forward end 71. The user can insert battery pack 10 either from above, through the open top, or the user can insert battery pack 10 through open forward end 71. Once initially inserted, housing base 15 will be in contact with pocket base 73. Center sill 27 will be in contact with center sill 75, and runners 41 (FIG. 4) will locate on each side of center sill 75 to maintain alignment. The user then pushes battery pack 10 rearward until rearward wall 19 is in substantial contact with rearward wall 69. Electrical connectors 89 will slide into the receptacles 9 (FIG. 7) during this movement. If necessary, some in compliance movement of electrical connectors 53 horizontal and vertical directions relative to axis 22 will occur. Detent 37 will snap into slot 85. The rearward portions 43a of flanges 43 will slide between shoulders 83 and pocket base lateral margins 77, as shown in FIG. 2.

Once in place, shoulders 83 lock the forward end of battery pack 10 from vertical movement relative to pocket base 73. The electrical connectors 53, 89 lock the rearward end of battery pack 10 from vertical movement relative to pocket 13. Detent 37 and slot 85 lock battery pack 10 from forward and rearward longitudinal movement relative to pocket 13. Runners 41 and sidewalls 23, 72 prevent lateral movement of battery pack 10 relative to longitudinal axis 22.

I claim:

1. A battery pack assembly, comprising in combination:

a rectangular pocket having a longitudinal axis, a base, an open forward end and a rearward wall;

a plurality of electrical connectors mounted at the rearward wall of the pocket;

a slot formed in the base near the forward end of the pocket perpendicular to the axis;

a pair of shoulders near the forward end of the pocket on opposite sides of the axis, spaced from and facing the base;

a removable battery housing for holding a battery, the housing having a forward wall, a rearward wall and a base;

a plurality of electrical connectors located at the rearward wall of the housing;

the base of the housing having a pair of laterally spaced-apart flanges on each side of the axis and a cantilevered resilient tab located between the flanges at the forward wall of the housing, the tab having a protruding detent; and wherein the housing latches into the pocket by placing the base of the housing in contact with the base of the pocket and sliding the housing rearwardly, causing the electrical connectors of the housing and the pocket to insert into one another, the flanges to slide between the base of the housing and the shoulders, and the detent to snap into the slot as the rearward wall of the housing reaches the rearward wall of the pocket.

2. The assembly according to claim 1 wherein a pair of pedestals are mounted to the base and laterally spaced apart from each other on each side of the axis near the forward end of the pocket, each of the pedestals having an enlarged head, each of the heads having one of the shoulders.

3. The assembly according to claim 1, further comprising:

a recess in the base of the pocket at the forward end of the pocket; and a recess at the forward wall of the housing, the recess providing for manual access and movement of a forward end of the tab away from the base to release the detent from the slot for withdrawal of the housing from the pocket.

4. The assembly according to claim 1, wherein the electrical connectors of the pocket are mounted at a junction between the end wall of the pocket and the base of the pocket.

5. The assembly according to claim 1, further comprising mounting means for mounting the electrical connectors of the housing to prevent movement relative to the housing along the longitudinal axis but allow a limited amount of compliance movement of the electrical connectors of the housing in directions other than longitudinally.

6. The assembly according to claim 5, wherein each of the electrical connectors of the housing is cylindrical and has an intermediate neck section of reduced diameter, defining forward and rearward shoulders; and the mounting means comprises:

a plurality of holes formed in a lateral row in the housing next to the rearward wall of the housing, each of the electrical connectors of the housing protruding through one of the holes, with the neck section located within the housing; and a retainer which mounts rigidly in the housing perpendicular to the axis, the retainer having a thickness equal to a longitudinal length of each of the neck sections and a plurality of open-ended apertures for loosely fitting over the neck sections, the apertures having widths dimensioned for abutment with the forward and rearward shoulders of the neck sections to prevent axial movement of the electrical connectors of the housing relative to the housing, the loose fit of the apertures on the neck sections allowing pivotal compliance movement of the electrical connectors of the housing.

7. The assembly according to claim 1, wherein the pocket has sidewalls which diverge outward relative to the base, and the housing has mating sidewalls.

8. The assembly according to claim 1, further comprising:

a pair of diagonal corners located at a junction of the end wall and the base of the pocket on opposite sides of the axis; and mating diagonal corners formed at the end wall of the housing.

9. A battery pack for insertion within a pocket to provide electrical power to a device, comprising in combination:

a housing for containing a plurality of batteries, the housing having a base, a forward wall, a rearward wall, two sidewalls, and a top, the housing having a longitudinal axis extending along the base and intersecting the forward and rearward walls;

a plurality of housing electrical connectors for telescoping engagement with mating pocket electrical connectors in the pocket;

mounting means for mounting the housing electrical connectors to the housing at the rearward wall to prevent movement of the housing electrical connectors relative to the housing along the longitudinal axis but allow a limited amount of compliance movement of the housing electrical connectors in directions other than longitudinally;

the base having a center sill of lesser width than a distance between the sidewalls and two laterally spaced apart side platforms which are parallel to and elevated from the center sill and which join the center sill and the sidewalls, the base having a forward platform located forward of and elevated from the center sill and which joins the center sill and the forward wall;

a pair of laterally spaced-apart flanges, each located at the forward wall in a plane with the center sill and extending a short distance toward the rearward wall for engaging mating shoulders provided in the pocket; and a cantilevered resilient tab extending forward from and in a plane with the center sill between the flanges and under the forward platform, the tab having a forward edge and a protruding detent spaced rearward from the forward edge for engaging a locking slot provided in the pocket.

10. The battery pack according to claim 9, wherein each of the housing electrical connectors is cylindrical and has an intermediate neck section of reduced diameter, defining forward and rearward shoulders; and the mounting means comprises:

a plurality of holes formed in a lateral row in the housing next to the rearward wall of the housing, each of the housing electrical connectors protruding through one of the holes, with the neck section located within the housing; and a retainer which mounts rigidly in the housing perpendicular to the axis, the retainer having a thickness equal to a longitudinal length of each of the neck sections and a plurality of open-ended apertures for loosely fitting over the neck sections, the apertures having widths dimensioned for abutment with the forward and rearward shoulders of the neck sections to prevent axial movement of the housing electrical connectors relative to the housing, the loose fit of the apertures on the neck sections allowing pivotal compliance movement of the housing electrical connectors.

11. The battery pack according to claim 9, wherein the sidewalls diverge outward, having a lesser distance between them at a junction with the side platforms than at the top.

12. A battery pack assembly for providing power from a plurality of batteries to an electrical device, comprising in combination:

a pocket having a longitudinal axis, an open forward end, a rearward wall, a base, an open top, and two sidewalls;

a plurality of pocket electrical connectors mounted at the rearward wall of the pocket and adapted to be electrically connected to the device;

a slot formed in the base next to the forward end of the pocket, the slot extending perpendicular to the axis;

a pair of laterally spaced-apart shoulders next to the forward end of the pocket on opposite sides of the axis, spaced above and facing the base;

a removable battery housing for holding a battery, the housing having a forward wall, a rearward wall, and a base;

a plurality of housing electrical connectors for telescoping engagement with the pocket electrical connectors;

mounting means for mounting the housing electrical connectors to the housing at the rearward wall of the housing to prevent movement of the housing electrical connectors relative to the housing along the longitudinal axis but allow a limited amount of pivotal compliance movement of the housing electrical connectors in directions other than longitudinally;

the base of the housing having a center sill of lesser width than a distance between the sidewalls and two laterally spaced apart side platforms which are parallel to and elevated from the center sill and which join the center sill and the sidewalls, the base of the housing having a forward platform located forward of and elevated from the center sill and which joins the center sill and the forward wall of the housing;

a pair of laterally spaced-apart flanges, each located at the forward wall of the housing in a plane with the center sill and extending a short distance toward the rearward wall of the housing for engaging the shoulders in the pocket; and a cantilevered resilient tab extending forward from and in a plane with the center sill between the flanges and under the forward platform, the tab having a forward edge and a protruding detent spaced rearward from the forward edge for engaging the slot provided in the pocket; and wherein the housing latches into the pocket by placing the base of the housing in contact with the base of the pocket and sliding the housing rearwardly, causing the housing electrical connectors and the pocket electrical connectors to insert into one another, the flanges to slide between the base of the housing and the shoulders, and the detent to snap into the slot as the rearward wall of the housing reaches the rearward wall of the pocket.

13. The assembly according to claim 12, wherein each of the housing electrical connectors is cylindrical and has an intermediate neck section of reduced diameter, defining forward and rearward shoulders; and the mounting means comprises:

a plurality of holes formed in a lateral row in the housing next to the rearward wall of the housing, each of the housing electrical connectors protruding through one of the holes, with the neck section located within the housing; and a retainer which mounts rigidly in the housing perpendicular to the axis, the retainer having a thickness equal to a longitudinal length of each of the neck sections and a plurality of open-ended apertures for loosely fitting over the neck sections, the apertures having widths dimensioned for abutment with the forward and rearward shoulders of the neck sections to prevent axial movement of the housing electrical connectors relative to the housing, the loose fit of the apertures on the neck sections allowing pivotal compliance movement of the housing electrical connectors.

14. The assembly according to claim 12 wherein a pair of pedestals are mounted to the base and laterally spaced apart from each other on each side of the axis near the forward end of the pocket, each of the pedestals having an enlarged head, each of the heads having one of the shoulders formed thereon.

15. The assembly according to claim 12, wherein the sidewalls of the housing diverge outward, having a lesser dimension between them at a junction with the side platforms than at the top, and wherein the sidewalls of the pocket diverge outward from the base of the pocket.

16. The assembly according to claim 12, further comprising:

a recess at the forward end of the base of the pocket, forward of the slot, a space between the tab and the forward platform combining with the recess to provide for manual access and pivotal movement of the tab to release the detent from the slot for withdrawal of the housing from the pocket.

* * * * *